US012355492B2

(12) United States Patent
Liu et al.

(10) Patent No.: US 12,355,492 B2
(45) Date of Patent: Jul. 8, 2025

(54) SPECTRALLY INTERLEAVED OPTICAL TRANSCEIVERS

(71) Applicant: Lightmatter, Inc., Boston, MA (US)

(72) Inventors: Kuang Liu, Queen Creek, AZ (US); Binoy Shah, Niskayuna, NY (US); Sandeep Sane, Chandler, AZ (US); Jessie Rosenberg, Bedford, MA (US); Nikhil Kumar, East Palo Alto, CA (US); Anthony Kopa, Somerville, MA (US); Carlos Dorta-Quinones, Medford, MA (US); Steven Klinger, Saratoga, CA (US); Darius Bunandar, Boston, MA (US); Nicholas C. Harris, Menlo Park, CA (US); Srinivasan Ashwyn Srinivasan, Toronto (CA); Elliot Greenwald, Somerville, MA (US)

(73) Assignee: Lightmatter, Inc., Boston, MA (US)

( * ) Notice: Subject to any disclaimer, the term of this patent is extended or adjusted under 35 U.S.C. 154(b) by 0 days.

(21) Appl. No.: 18/896,129

(22) Filed: Sep. 25, 2024

(65) Prior Publication Data

US 2025/0105921 A1    Mar. 27, 2025

Related U.S. Application Data

(60) Provisional application No. 63/696,833, filed on Sep. 19, 2024, provisional application No. 63/585,923, filed on Sep. 27, 2023.

(51) Int. Cl.
*H04B 10/40* (2013.01)
*G02B 6/293* (2006.01)

(52) U.S. Cl.
CPC ......... *H04B 10/40* (2013.01); *G02B 6/29335* (2013.01); *G02B 6/29352* (2013.01); *G02B 6/29386* (2013.01)

(58) Field of Classification Search
CPC ............... H04B 10/40; G02B 6/29335; G02B 6/29352; G02B 6/29386
See application file for complete search history.

(56) References Cited

U.S. PATENT DOCUMENTS 5,347,601 A * 9/1994 Ade ..................... H04B 10/40
                                                     398/139
5,351,317 A    9/1994 Weber
(Continued)

FOREIGN PATENT DOCUMENTS

WO    WO 2019/131804 A1    7/2019

OTHER PUBLICATIONS

Liu, Yuan, A Novel 16-Channel WDM Silicon Photonics Transceiver with Interleavers for Simplified Ring Modulator/Filter Implementation, 2022, Optica Publishing Group 2022, All pages (Year: 2022).*

(Continued)

*Primary Examiner* — Pranesh K Barua
(74) *Attorney, Agent, or Firm* — Wolf, Greenfield & Sacks, P.C.

(57) ABSTRACT

Described herein are wavelength division multiplexing (WDM) transceivers configured to support fast, bidirectional communication over optical channels. An optical transceiver comprises a transmitter, a receiver, an input/output (I/O) port and an optical interleaver. The transmitter comprises a first bus waveguide and a plurality of optical modulators coupled to the first bus waveguide, each of the optical modulators being resonant at a respective wavelengths in a first wavelength set. The receiver comprises a second bus waveguide and a plurality of optical filters coupled to the second bus waveguide, each of the optical filters being resonant at a respective wavelength in a second wavelength set. The I/O port is coupled to an optical channel. The optical interleaver is configured to selectively couple light having wavelengths (Continued)

in the first wavelength set from the first waveguide bus to the I/O port, and selectively couple light having wavelengths in the second wavelength set from the I/O port to the second bus waveguide.

22 Claims, 9 Drawing Sheets

(56) References Cited

U.S. PATENT DOCUMENTS

| | | | |
|---|---|---|---|
| 5,691,700 | A | 11/1997 | Phelps et al. |
| 6,694,102 | B2* | 2/2004 | Baumann ............ G02B 6/12 |
| | | | 398/200 |
| 7,573,210 | B2 | 8/2009 | Ashdown et al. |
| 7,718,948 | B2 | 5/2010 | Kiesel et al. |
| 7,977,622 | B2 | 7/2011 | McLaren et al. |
| 9,020,351 | B1* | 4/2015 | Wach ................. H04J 14/0307 |
| | | | 398/79 |
| 9,097,526 | B1 | 8/2015 | Sanders et al. |
| 9,559,487 | B2 | 1/2017 | Doerr |
| 9,618,821 | B2 | 4/2017 | Jewart et al. |
| 11,057,143 | B1* | 7/2021 | Van Vaerenbergh .. G11C 15/00 |
| 11,409,045 | B2 | 8/2022 | Dorta-Quinones et al. |
| 11,686,902 | B2 | 6/2023 | Dorta-Quinones et al. |
| 2002/0126479 | A1 | 9/2002 | Zhai et al. |
| 2003/0039461 | A1* | 2/2003 | How Kee Chun ..... G02F 1/225 |
| | | | 385/140 |
| 2003/0072534 | A1 | 4/2003 | Bona et al. |
| 2005/0013332 | A1 | 1/2005 | Kish et al. |
| 2006/0056480 | A1 | 3/2006 | Mielke et al. |
| 2006/0182441 | A1 | 8/2006 | Kish et al. |
| 2006/0198415 | A1 | 9/2006 | Yamazaki |
| 2007/0189778 | A1* | 8/2007 | Burns ....................... H01P 1/32 |
| | | | 398/183 |
| 2008/0084320 | A1 | 4/2008 | Chen |
| 2009/0245794 | A1 | 10/2009 | Sakharov |
| 2011/0249936 | A1 | 10/2011 | Welch et al. |
| 2013/0077976 | A1* | 3/2013 | Dong ..................... H04J 14/02 |
| | | | 398/82 |
| 2015/0132015 | A1 | 5/2015 | Hayakawa |
| 2015/0341122 | A1 | 11/2015 | Toda |
| 2017/0302398 | A1 | 10/2017 | Yin et al. |
| 2017/0315424 | A1 | 11/2017 | Celo et al. |
| 2018/0366915 | A1 | 12/2018 | Zilkie et al. |
| 2019/0324298 | A1 | 10/2019 | Dayel et al. |
| 2019/0391335 | A1 | 12/2019 | Tan et al. |
| 2021/0003904 | A1 | 1/2021 | Dorta-Quinones et al. |
| 2021/0286128 | A1 | 9/2021 | Harris |
| 2022/0286208 | A1* | 9/2022 | Wang ................ H04B 10/5051 |
| 2023/0168076 | A1* | 6/2023 | Ravi ................. G02B 6/29352 |
| | | | 356/477 |
| 2024/0007192 | A1* | 1/2024 | Davenport ........... H04B 10/506 |

OTHER PUBLICATIONS

International Search Report and Written Opinion dated Dec. 12, 2024, in connection with International Application No. PCT/US2024/048352.
Wang et al. Scalable architecture for sub-pJ/b multi-Tbps comb-driven DWDM silicon photonic transceiver. Proc. of SPIE. Mar. 15, 2023;12429:124291F. DOI:10.1117/12.2649506.
Papaioannou et al. On-Chip Dual-Stream DWDM Eight-Channel-Capable SOI-Based MUXs/DEMUXs With 40-GHz Channel Bandwidth. IEEE Photonics Journal. Feb. 2015;1(7). 10 Pages.
Rizzo et al., Petabit-Scale Silicon Photonic Interconnect With Integrated Kerr Frequency Combs. IEEE Journal of Selected Topics in Quantum Electronics. Jan. 2023.29(1). 20 Pages.

* cited by examiner

SPECTRALLY INTERLEAVED OPTICAL TRANSCEIVERS

CROSS-REFERENCE TO RELATED APPLICATIONS

This application claims the benefit under 35 U.S.C. § 119(c) of U.S. Provisional Patent Application Ser. No. 63/585,923, entitled "PHOTONIC INTERCONNECT," filed on Sep. 27, 2023, and U.S. Provisional Patent Application Ser. No. 63/696,833, entitled "PHOTONIC DEVICES WITH INTERLEAVED OPTICAL CHANNELS AND POLARIZATION CONTROL," filed on Sep. 19, 2024, each of which is hereby incorporated herein by reference in its entirety.

BACKGROUND

Optical transceivers are devices that transmit and receive data using light signals, typically over optical fiber cables. Optical transceivers play a crucial role in telecommunications and data communication networks, converting electrical signals into optical signals for transmission and then converting them back into electrical signals at the receiving end. Wavelength division multiplexing (WDM) is a technology used in optical communication to transmit multiple signals simultaneously over a single optical fiber. WDM achieves this by using different wavelengths (colors) of light for each signal, allowing for efficient use of the fiber's bandwidth and significantly increasing the data-carrying capacity.

Ring resonator-based WDM transmitters are advanced components used in optical communications to achieve efficient WDM. These devices leverage the properties of ring resonators to filter and control specific wavelengths of light, allowing for the precise manipulation and routing of optical signals in a WDM system. When multiple wavelengths of light are introduced into a waveguide, a ring resonator selectively couples the wavelength that matches its resonant wavelength. This enables it to act as a filter, allowing only the desired wavelength to pass through or be dropped into an adjacent waveguide.

SUMMARY OF THE DISCLOSURE

Some embodiments relate to an optical transceiver, comprising a transmitter comprising a first bus waveguide and a plurality of optical modulators coupled to the first bus waveguide, each of the plurality of optical modulators being resonant at a respective wavelength in a first wavelength set; a receiver comprising a second bus waveguide and a plurality of optical filters coupled to the second bus waveguide, each of the plurality of optical filters being resonant at a respective wavelength in a second wavelength set; an input/output (I/O) port configured to be coupled to an optical channel, wherein the I/O port forms part of a transmit path coupling the transmitter to the optical channel when the optical channel is coupled to the I/O port and wherein the I/O port forms part of a receive path coupling the receiver to the optical channel when the optical channel is coupled to the I/O port; and an optical interleaver configured to: selectively couple light having carrier wavelengths in the first wavelength set from the first waveguide bus to the I/O port, and selectively couple light having carrier wavelengths in the second wavelength set from the I/O port to the second bus waveguide.

In some embodiments, the optical interleaver comprises a Mach Zehnder interferometer (MZI) having a first coupler coupled to both the first and second bus waveguides and a second coupler coupled to the I/O port.

In some embodiments, the Mach Zehnder interferometer is a multi-stage MZI, wherein the multi-stage MZI further comprises a third coupler, wherein the third coupler is coupled to both a first stage of the multi-stage MZI and a second stage of the multi-stage MZI.

In some embodiments, the first stage of the multi-stage MZI defines a first optical path length difference and the second stage of the multi-stage MZI defines a second optical path length difference different from the first optical path length difference.

In some embodiments, the first optical path length difference is about twice the second optical path length difference.

In some embodiments, the optical interleaver comprises at least one interferometer selected from the group consisting of a multimode interferometer (MMI) device, an arrayed waveguide grating (AWG) and an asymmetric Mach Zehnder interferometer (MZI).

In some embodiments, the carrier wavelengths of the first wavelength set are contiguous and the carrier wavelengths of the second wavelength set are contiguous.

In some embodiments, the optical interleaver comprises first and second optical arms, wherein an optical path length difference between the first and second optical arms is configured to cause the optical interleaver to selectively couple light having the contiguous carrier wavelengths in the first wavelength set from the first waveguide bus to the I/O port, and selectively couple light having the contiguous carrier wavelengths in the second wavelength set from the I/O port to the second bus waveguide.

In some embodiments, the carrier wavelengths of the first wavelength set alternate with the carrier wavelengths of the second wavelength set.

In some embodiments, the optical interleaver comprises first and second optical arms, wherein an optical path length difference between the first and second optical arms is configured to cause the optical interleaver to selectively couple light having the alternating carrier wavelengths in the first wavelength set from the first waveguide bus to the I/O port, and selectively couple light having the alternating carrier wavelengths in the second wavelength set from the I/O port to the second bus waveguide.

In some embodiments, the optical transceiver further comprises an optical polarization controller coupled between the I/O port and the optical interleaver, wherein the optical polarization controller is configured to provide a pair of output transverse electric (TE) modes to the optical interleaver upon receiving an input TE mode and an input transverse magnetic (TM) mode from the optical channel when the optical channel is coupled to the I/O port.

In some embodiments, the transmitter, the receiver, the I/O port and the optical interleaver are integrated on a common substrate, and wherein the I/O port comprises a grating coupler or an edge coupler.

In some embodiments, the carrier wavelengths in the first wavelength set are spaced from one another by a spectral separation in a range of 1.72 nm-2.86 nm and the carrier wavelengths in the second wavelength set are spaced from one another by a spectral separation in a range of 1.72 nm-2.86 nm.

In some embodiments, the plurality of optical modulators have free spectral ranges (FSR) that are less than 11.44 nm.

Some embodiments relate to an optical transceiver, comprising a transmit bus waveguide and a plurality of optical resonant modulators coupled to the transmit bus waveguide; a receive bus waveguide and a plurality of optical resonant filters coupled to the receive bus waveguide; and an asymmetric Mach Zehnder interferometer (MZI) having a first end and a second end opposite the first end, wherein the first end comprises a first waveguide coupled to the transmit bus waveguide and a second waveguide coupled to the receive bus waveguide, and wherein the second end comprises a third waveguide.

In some embodiments, the asymmetric MZI comprises a plurality of stages defining a plurality of optical path length differences, wherein the optical path length differences are configured to cause the asymmetric MZI to selectively couple light having contiguous carrier wavelengths in a first band from the first waveguide to the third waveguide, and selectively couple light having contiguous carrier wavelengths in a second band from the third waveguide to the second waveguide.

In some embodiments, the asymmetric MZI comprises a plurality of stages defining a plurality of optical path length differences, wherein the optical path length differences are configured to cause the asymmetric MZI to selectively couple light having carrier wavelengths in a first wavelength set from the first waveguide to the third waveguide, and selectively couple light having carrier wavelengths in a second wavelength set from the third waveguide to the second waveguide, wherein the carrier wavelengths of the first wavelength set alternate with the carrier wavelengths of the second wavelength set.

In some embodiments, a first carrier wavelength of the first wavelength set and a second carrier wavelength of the second wavelength set that are adjacent to one another are spaced from one another by a spectral separation in a range of 1.14 nm-2.28 nm.

In some embodiments, the optical transceiver further comprises an optical polarization controller coupled to the third waveguide of the asymmetric MZI, wherein the optical polarization controller is configured to provide a pair of output transverse electric (TE) modes to the asymmetric MZI upon receiving an input TE mode and an input transverse magnetic (TM) mode.

In some embodiments, the asymmetric MZI further comprises a phase shifter positioned between the first end and the second end, wherein the second end of the asymmetric MZI further comprises a fourth waveguide; a photodetector coupled to the fourth waveguide; and a controller configured to receive photocurrent produced by the photodetector and to control the phase shifter, based on the photocurrent, so as to minimize an amount of optical power coupled to the fourth waveguide.

BRIEF DESCRIPTION OF DRAWINGS

Various aspects and embodiments of the application will be described with reference to the following figures. It should be appreciated that the figures are not necessarily drawn to scale. Items appearing in multiple figures are indicated by the same reference number in the figures in which they appear.

DETAILED DESCRIPTION

I. Overview

Described herein are wavelength division multiplexing (WDM) transceivers configured to support fast, bidirectional communication over optical channels (e.g., fibers, waveguides or free space optical media). The bidirectional transceivers developed by the inventors and described herein are configured to support larger numbers of WDM channels than what is practical using conventional implementations, thus increasing the aggregate data rate supported by a transceiver.

The inventors have recognized and appreciated that bidirectionality in conventional transceivers (whereby a common optical channel supports communication in opposite directions) is often achieved at the expense of data rate. For example, in conventional transceivers using resonant modulators, the number of WDM channels is limited by the free spectral range (FSR) that can be practically achieved on chip. The FSR of a resonator is the wavelength interval between consecutive resonant orders of a resonator. Thus, the FSR represents the spacing between adjacent wavelength orders at which a resonator resonates. The FSR of a resonator has an inverse relationship to the length of the modulator. For example, the FSR of a ring resonator is inversely proportional to the circumference of the ring. In the interest of limiting real estate occupancy and power consumption, on-chip ring resonators are often designed to have areas as small as a few tens of $\mu m^2$. The result is that the maximum FSR that can be achieved in practice is less than about 11.44 nm, corresponding to about 2 THz in the O-band (the spectral communication window encompassing the 1310 nm wavelength). This means that, assuming a channel spacing of about 1.43 nm (corresponding to a frequency spacing of about 250 GHz in the O-band), the transceiver can support eight WDM channels at most-four WDM channels in one direction and four WDM channels in the opposite direction.

The inventors have developed WDM transceivers configured to support fast, bidirectional communication over optical channels notwithstanding the limited FSR of optical resonant modulators. The WDM transceivers developed by the inventors and described herein split the transmitter and the receiver into two physically distinct components. Instead of allowing the transmitter and the receiver to share a common bus waveguide as in some conventional transceivers, the transmitter includes a dedicated transmit bus waveguide and the receiver includes a dedicated receive bus waveguide. Splitting the bus waveguides in this way allows the transceiver to pack twice as many WDM channels in the same spectral band, relative to implementations using shared buses, without having to increase the FSR of the modulators beyond what is desirable on chip.

However, splitting the bus waveguides in this way presents a challenge. Wavelengths assigned to the transmitter may inadvertently couple to the receive bus waveguide and/or wavelengths assigned to the receiver may inadvertently couple to the transmit bus waveguide. This phenomenon can lead to cross talk, which can reduce the performance of a transceiver. The inventors have developed interleavers configured to allow a transceiver to communicate with other devices bidirectionally while avoiding interference between signals traveling in opposite directions. Some embodiments assign a first set of wavelengths to the transmitter and a second set of wavelengths to the receiver. The carrier wavelengths of the first and second sets may be alternating or may be contiguous, for example. An interleaver may be designed to promote selective coupling using a combination of constructive and destructive interference. Wavelengths that are coupled from the transmitter to an off-chip optical channel thanks to constructive interference do not couple to the receiver because of destructive interference. Similarly, wavelengths that are coupled from the off-chip optical channel to the receiver thanks to constructive interference do not couple to the transmitter because of destructive interference. In some embodiments, selective coupling is achieved using interferometers designed to provide spectral responses that are $\pi$-shifted relative to one another. For example, at one terminal, the interferometer may exhibit a certain spectral response and, at another terminal, the interferometer may exhibit a $\pi$-shifted version of the same spectral response. Some embodiments employ asymmetric Mach Zehnder interferometers (MZI) to produce this effect.

WDM channels of the types described herein form wavelength intervals used to perform optical communication consistent with WDM techniques. Each WDM channels is characterized by a corresponding carrier wavelength. A carrier wavelength of a WDM channel may be the wavelength positioned in the middle of the wavelength interval of a WDM channel. Alternatively or additionally, a carrier wavelength of a WDM channel may be the wavelength that exhibits the absolute peak intensity within the wavelength interval of a WDM channel. Alternatively or additionally, a carrier wavelength of a WDM channel may be the nominal wavelength of emission of an optical source. The wavelength of emission may be "nominal" in that the optical source may emit a finite spectrum of wavelengths around the nominal wavelength due to spectral broadening effects.

II. WDM Transceivers

Figure 1:
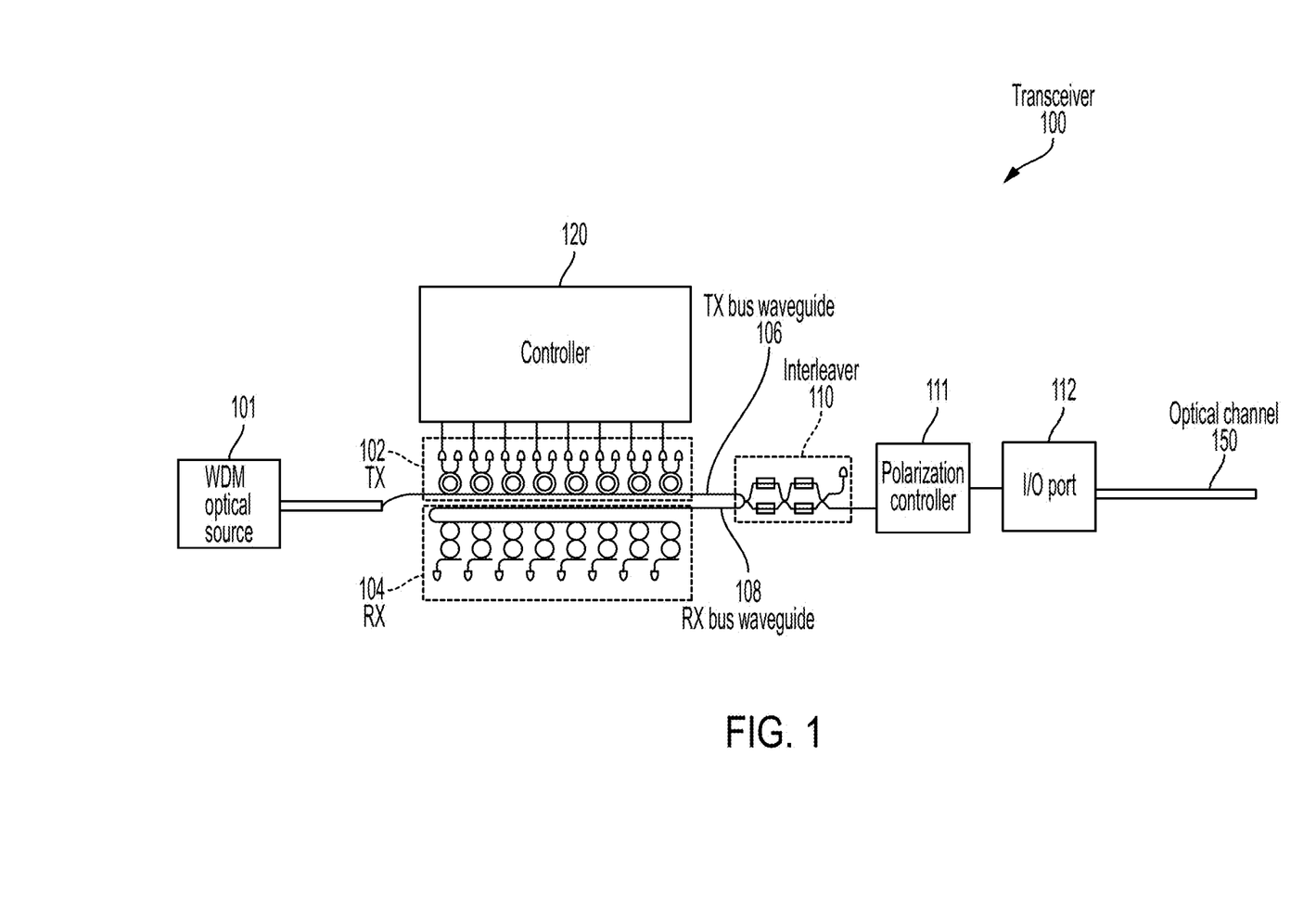
FIG. 1 is a schematic diagram of a wavelength division multiplexing (WDM) transceiver, in accordance with some embodiments.

FIG. 1 is a schematic diagram of a WDM transceiver, in accordance with some embodiments. Transceiver 100 includes a WDM optical source 101, a transmitter (TX) 102, a receiver (RX) 104, an interleaver 110, a polarization controller 111, an input/output (I/O) port 112, a controller 120 and an optical channel 150. In some embodiments, TX 102, RX 104, interleaver 110, polarization controller 111, and I/O port 112 may be integrated on the same substrate, such as a silicon-based photonic integrated circuit (PIC). Optical channel 150, coupling the PIC to an external device, may be off chip. Optical channel 150 may be implemented as a fiber, a waveguide or a free space optical channel. WDM optical source 101 may be off chip, and may be coupled to the PIC using another optical channel.

The WDM transceiver of FIG. 1 communicates with external devices through optical channel 150 in a bidirectional fashion. In one direction (left to right in FIG. 1), optical channel 150 supports propagation of optical signals generated by TX 102. The transmit path includes TX 102, interleaver 110, polarization controller 111, I/O port 112 and optical channel 150 (although other components may be included along the transmit path). In the other direction (right to left in FIG. 1), optical channel 150 supports propagation of optical signals directed to RX 104. The receive path includes optical channel 150, I/O port 112, polarization controller 111, interleaver 110 and RX 104 (although other components may be included along the receive path). As described in detail further below, interleaver 110 enables transceiver 100 to operate bidirectionally while reducing or preventing interference between the transmit channels and the receive channels.

I/O port 112 permits communication with optical channel 150. For example, I/O port 112 may include an edge coupler configured to enable edge coupling to a fiber, or a grating coupler configured to enable out-of-plane coupling to a fiber.

WDM optical source 101 is configured to emit light at multiple discrete carrier wavelengths, where each carrier wavelength is intended to support a respective WDM channel. WDM optical source 101 may be implemented, for example, using a bank of lasers emitting light at different carrier wavelengths. In some embodiments, WDM optical source 101 produces carrier wavelengths in the O-band. Adjacent carrier wavelengths may be spaced from one another by a wavelength separation in the range of 1.72 nm-2.86 nm in some embodiments. This wavelength separation, corresponding to a frequency separation of about 300 GHz-500 GHz in the O-band, provides sufficient room to prevent adjacent spectral channels from interfering with each other in the presence of spectral broadening. Spectral broadening is a phenomenon that occurs, among other potential causes, as a result of modulation. When the output of a monochromatic (or quasi-monochromatic) optical source is modulated with data, the spectrum of the signal broadens because the modulation introduces sidebands and additional frequency components. For example, amplitude modulation creates sidebands above and below a laser's carrier wavelength.

Figure 2A:
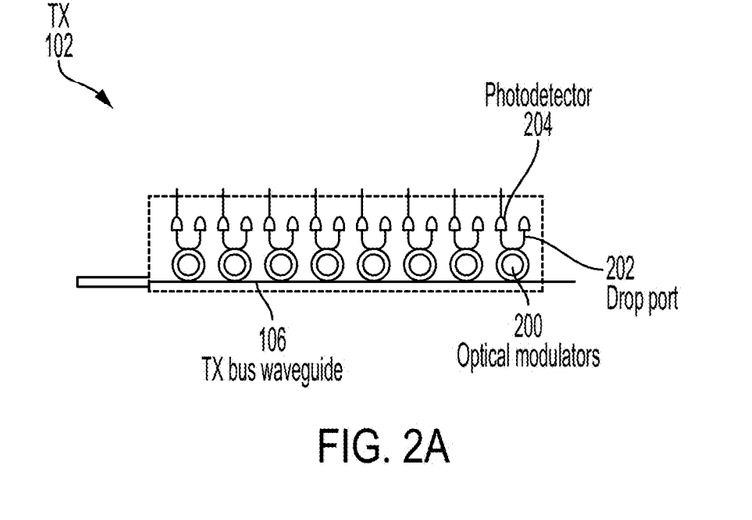
FIG. 2A is a schematic diagram illustrating the transmitter of the WDM transceiver of FIG. 1 in more detail, in accordance with some embodiments.

Light generated by WDM optical source 101 is coupled to TX 102 through an optical channel, e.g., a fiber. FIG. 2A illustrates TX 102 in more detail. As shown, TX 102 includes a bus waveguide 106 (referred to herein as "TX bus waveguide 106" or "transmit bus waveguide 106") and a bank of optical modulators 200. TX bus waveguide 106 may be formed, for example, by patterning a ridge waveguide on a silicon (or silicon nitride) layer of a substrate, although other types of waveguides are also possible. Light generated by WDM optical source 101 is coupled to, and propagates along, TX bus waveguide 106. As the light propagates along TX bus waveguide 106 (from left to right in the example of FIG. 2A), each carrier wavelength couples only to a corresponding optical modulator 200. An optical modulator 200 encodes data into incoming light propagating at the designated carrier wavelength based on an electrical signal received from controller 120 (or based on a signal derived from an electrical signal received from controller 120). Thus, an optical modulator 200 outputs an optical signal encoded with data. In some embodiments, TX 102 includes one optical modulator 200 for each WDM channel. In one example, WDM optical source 101 produces eight different carrier wavelengths and TX 102 includes eight modulators. Each modulator receives light at a particular carrier wavelength (and the wavelength interval surrounding the carrier wavelength) while the other carrier wavelengths continue to propagate along TX bus waveguide 106. This effect may be achieved by designing the optical modulators to operate as resonators. Optical resonators are devices that support propagation of light only within particular wavelength bands. Outside those bands, the resonator is transparent to light. In one example, the optical modulators are implemented as optical ring modulators. These types of modulators are able to perform optical modulation in that the amount of light that is coupled into or out of the modulator is controlled by shifting the resonance conditions, thereby changing the intensity of the output light. Each modulator may be modulated using a different electrical input signal, thus achieving wavelength division multiplexing. As a result, the output of TX bus waveguide 106 (on the right-hand side of FIG. 2A) includes several wavelengths, each wavelength being modulated by a corresponding electrical input signal. In some embodiments, the FSR of the optical modulators is less than 11.44 nm, corresponding to a maximum frequency separation of about 2 THz in the O-band.

Optionally, TX 102 may include drop ports 202 and photodetectors 204. Drop ports 202 and photodetectors 204 may be used to ensure that each modulator 200 is properly tuned. A small fraction of the total optical energy that couples to a modulator 200, when the resonant condition is satisfied, is further coupled to the drop port and is ultimately detected by the photodetector 204. The output of a photodetector 204 is transmitted to controller 120. Based on the received signal, controller 120 determines whether to re-calibrate the resonance condition of the modulator.

Referring back to FIG. 1, modulated light exiting TX 102 passes through interleaver 110, polarization controller 111 and I/O port 112, where it is ultimately coupled to optical channel 150 for transmission to an external device.

In addition to supporting propagation of optical signals generated by TX 102, optical channel 150 supports propagation of optical signals directed to RX 104. To avoid interference between signals traveling within optical channel 150 in opposite directions, some embodiments assign a first set of wavelengths to TX 102 and a second set of wavelengths to RX 104. In one example, TX 102 and RX 104 may be assigned alternating carrier wavelengths (e.g., TX 102 transmits light at carrier wavelengths $\lambda_1$, $\lambda_3$, $\lambda_5$, and $\lambda_7$ while RX 104 receives light at carrier wavelengths $\lambda_2$, $\lambda_4$, $\lambda_6$, and $\lambda_8$ where the value of $\lambda_i$ increases as the index i increases). In one example, a WDM configuration may define the following carrier wavelengths: 1301.47 nm, 1302.6 nm, 1303.73 nm, 1304.87 nm, 1306.01 nm, 1307.14 nm, 1308.28 nm and 1309.43 nm. In this example, the carrier wavelengths 1301.47 nm, 1303.73 nm, 1306.01 nm and 1308.28 nm may be assigned to TX 102 and the carrier wavelengths 1302.6 nm, 1304.87 nm, 1307.14 nm, and 1309.43 nm may be assigned to RX 104.

In another example, TX 102 and RX 104 may be assigned bands of contiguous carrier wavelengths (e.g., TX 102 transmits light at carrier wavelengths $\lambda_1$, $\lambda_2$, $\lambda_3$, and $\lambda_4$ while RX 104 receives light at carrier wavelengths $\lambda_5$, $\lambda_6$, $\lambda_7$, and $\lambda_8$). In this example, carrier wavelengths 1301.47 nm, 1302.6 nm, 1303.73 nm, 1304.87 nm may be assigned to TX 102 and carrier wavelengths 1306.01 nm, 1307.14 nm, 1308.28 nm and 1309.43 nm may be assigned to RX 104. Other schemes are also possible.

Figure 2B:
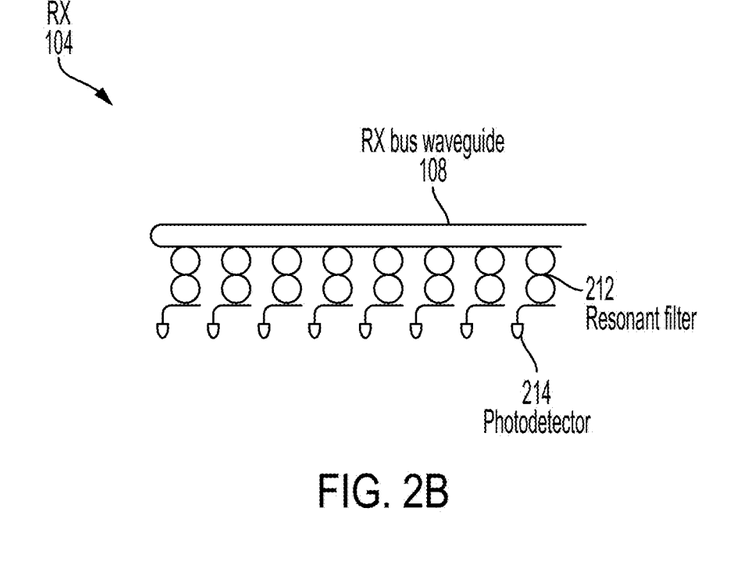
FIG. 2B is a schematic diagram illustrating the receiver of the WDM transceiver of FIG. 1 in more detail, in accordance with some embodiments.

Modulated light directed to transceiver 110 couples from optical channel 150 to I/O port 112, passes through polarization controller 111 and interleaver 110 and ultimately reaches RX 104, where it is detected. FIG. 2B illustrates RX 104 in more detail. As shown, RX 104 includes a bus waveguide 108 (referred to herein as "RX bus waveguide 108" or "receive bus waveguide 108"), a bank of resonant filters 212 that are coupled to photodetectors 214. As described in connection with TX bus waveguide 106, RX bus waveguide 108 may be formed, for example, by patterning a ridge waveguide on a silicon (or silicon nitride) layer of a substrate, although other types of waveguides are also possible. Although RX bus waveguide 108 is depicted as being U-shaped, other shapes are also possible. Each resonant filter may be tuned to extract light within a particular WDM channel, while allowing other wavelengths to propagate along the RX bus waveguide without loss. As described in connection with modulators 200, resonant filters 212 extract light only when the resonance condition is satisfied. As such, the bank of filters may be viewed as a wavelength demultiplexer. In the example of FIG. 2B, resonant filters 212 are implemented as second order ring resonators, with two rings coupled optically in series to one another. Relative to first order ring resonators (including a single ring), higher order ring resonators exhibit a sharper response, with a flatter top and steeper transitions. The result is that higher order filters are less sensitive to spectral drift arising as a result of thermal fluctuations. Each photodetector 214 detects the light extracted from RX bus waveguide 108 by the corresponding resonant filter 212. The signals detected by the photodetectors 214 may be in the form of photocurrents. Light extracted by the photodetectors 214 may be encoded with data, for example as a result of having passed through an optical modulator (similar to optical modulator 200) disposed on another transceiver. As such, upon conversion to the electrical domain by photodetectors 214, the detected signals are also detected with data.

III. Optical Interleavers

Figure 3A:
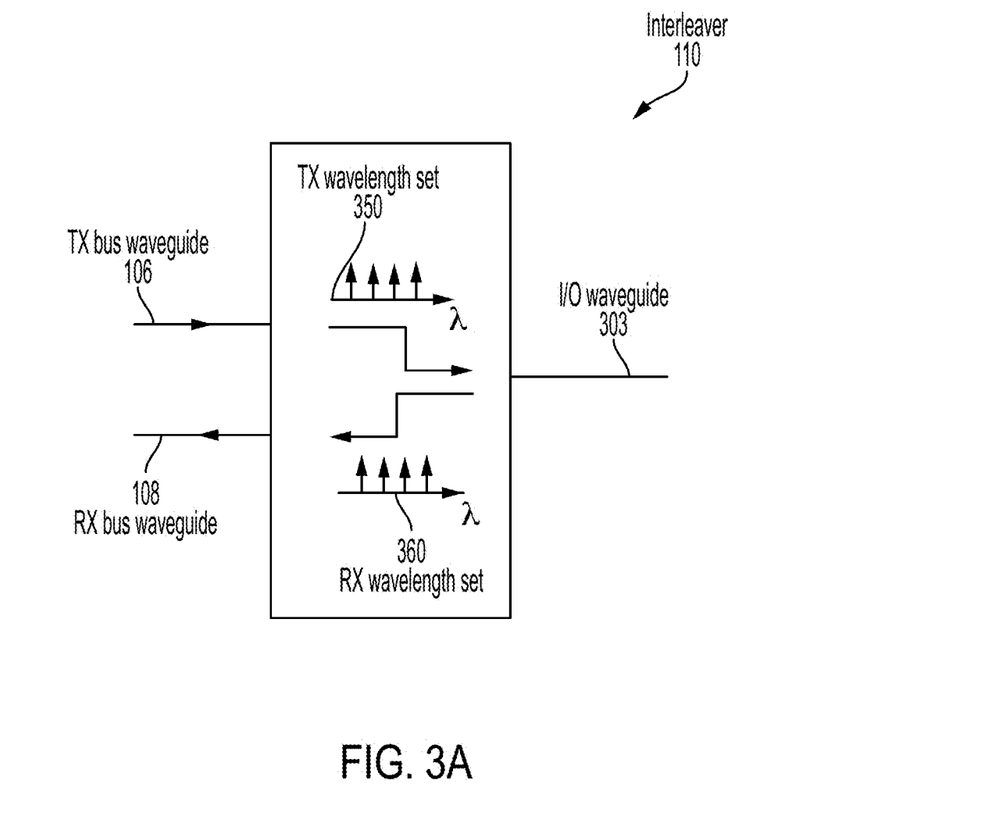
FIG. 3A is a functional diagram of the optical interleaver of the WDM transceiver of FIG. 1, in accordance with some embodiments.

Interleaver 110 allows transceiver 100 to communicate with external devices bidirectionally using the same optical channel while avoiding interference between signals traveling away from transceiver 100 and signals traveling towards transceiver 100. As described above, some embodiments assign a first set of wavelengths to TX 102 and a second set of wavelengths to RX 104, whether in an alternating or contiguous fashion (or otherwise). The wavelength set assigned to TX 102 will be referred to as the "TX wavelength set" or "transmit wavelength set" and the wavelength set assigned to RX 104 will be referred to as the "RX wavelength set" or "receive wavelength set." As such, TX 102 can modulate light at carrier wavelengths in the TX wavelength set and RX 104 can detect light at carrier wavelengths in the RX wavelength set. Interleaver 110 works in conjunction with TX 102 and RX 104 in that it promotes passage of light at the TX wavelength set from TX bus waveguide 106 towards I/O port 112 and it promotes passage of light at the RX wavelength set from I/O port 112 towards RX bus waveguide 108. Importantly, interleaver 110 does not permit passage of light at the TX wavelength set from TX bus waveguide 106 towards RX bus waveguide 108 and does not permit passage of light at the RX wavelength set from I/O port 112 towards TX bus waveguide 106 (although a small amount of power may in fact couple in this way due to unwanted reflections). As such, interference between transmit channels and receive channels is prevented. FIG. 3A is a functional diagram of interleaver 110, in accordance with some embodiments. As shown in FIG. 3A, interleaver 110 couples light at the TX wavelength set 350 from TX bus waveguide 106 to I/O waveguide 303 (which is coupled to polarization controller 111) while preventing the light from coupling to RX bus waveguide 108. Further, interleaver 110 couples light at the RX wavelength set 360 from I/O waveguide 303 to RX bus waveguide 108 while preventing the light from coupling to TX bus waveguide 106.

Figure 3B:
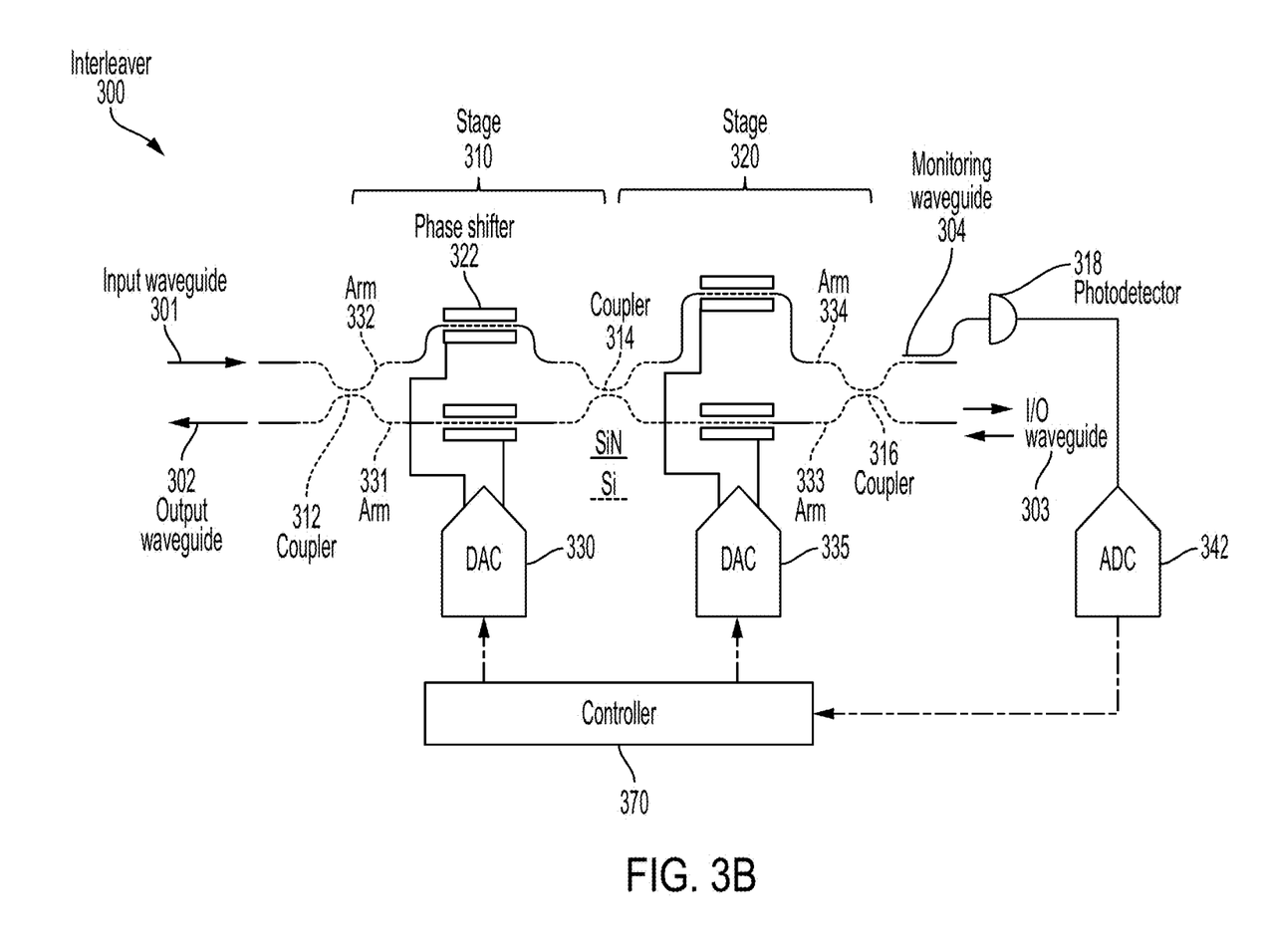
FIG. 3B is a schematic diagram illustrating an implementation of the optical interleaver of the WDM transceiver of FIG. 1, in accordance with some embodiments.

FIG. 3B is a schematic diagram illustrating a possible implementation of interleaver 110, in accordance with some embodiments. In this example, interleaver 300 is implemented as an asymmetric, multi-stage Mach Zehnder interferometer (MZI). However, other implementations are possible, including asymmetric, single-stage MZIs, multimode interferometer (MMI) devices and arrayed waveguide gratings (AWG). As described in detail further below, the asymmetric nature of interleaver 300 allows it to produce $\pi$-shifted spectral responses, which in turn allows the interleaver to accurately discriminate between carrier wavelengths in the TX wavelength set and carrier wavelengths in the RX wavelength set. Additionally, as described in detail further below, the multi-stage nature of interleaver 300 allows it to produce a sharper response, making the interleaver more robust against thermal fluctuations. Although interleaver 300 is a two-stage MZI in this example, N-stage interleavers with N>2 are also possible.

One end of interleaver 300 includes an input waveguide 301 and an output waveguide 302. Input waveguide 301 is coupled to TX bus waveguide 106 while output waveguide 302 is coupled to RX bus waveguide 108. The opposite end of interleaver 300 includes an I/O waveguide 303, which is coupled to the I/O port 112 via the optional polarization controller 111, and a monitoring waveguide 304. While input waveguide 301 and output waveguide 302 are intended to support propagation of light in only one direction (in opposite directions), I/O waveguide 303 is intended to support propagation of light in both directions. The opposite ends of interleaver 300 are separated by the portion of interleaver 300 where interference takes place (the interference portion). In this example, the interference portion includes two stages, stage 310 and stage 320. Coupler 312 couples input waveguide 301 and output waveguide 302 to stage 310. Coupler 314 couples stage 310 to stage 320. Coupler 316 couples stage 320 to I/O waveguide 303. In some embodiments, couplers 312, 314 and 316 are implemented as 2×2 directional couplers. Stage 310 includes a pair of arms (arms 331 and 332) extending between coupler 312 and coupler 314. In some embodiments, stage 310 is asymmetric in that the optical path length associated with arm 331 differs from the optical path length associated with arm 332. In this example, arm 332 is longer than arm 331. The result is that light travels a longer distance as it travels along arm 332 than it does as it travels along arm 331. Similarly, stage 320 includes a pair of arms (arms 333 and 334) extending between coupler 314 and coupler 316. In some embodiments, stage 320 is also asymmetric in that the optical path length associated with arm 333 differs from the optical path length associated with arm 334. In this example, arm 334 is longer than arm 333. Thus, both stages are asymmetric in this example. Interleavers of the types described herein are said to be asymmetric so long as at least one stage is asymmetric, although all the stages may be asymmetric in some embodiments. The extent of the asymmetries between the arms of the stages may be configured so that the spectral response of interleaver 300 at input waveguide 301 is a $\pi$-shifted version of the response of interleaver 300 at output waveguide 302. Having $\pi$-shifted responses ensures selective coupling: wavelengths coupling from input waveguide 301 to I/O waveguide 303 do not couple to output waveguide 302 and wavelengths coupling from I/O waveguide 303 to output waveguide 302 do not couple to input waveguide 301. In some embodiments, the optical path length difference associated with stage 320 is about twice the optical path length difference associated with stage 310 (though the opposite configuration is also possible). Additionally or alternatively, the optical path length difference associated with each stage may be an integer multiple of a unit optical path length difference. The inventors have appreciated that choosing the path differences in this way produces $\pi$-shifted responses while limiting losses.

In some embodiments, the arms of interleaver 300 may include tunable phase shifters 322. Phase shifters 322 are tunable in that the amount of phase shift introduced in an arm can be dynamically adjusted. The role of the phase shifters is to ensure that the vast majority (e.g., more than 90% or more than 95%) of the optical power present in the interferometer is ultimately coupled to I/O waveguide 303 (as opposed to being coupled to the monitoring waveguide 304, connected to photodetector 318). In this way, the insertion loss produced by the interleaver is minimized. To that end, interleaver 300 includes a feedback loop including an analog-to-digital converter (ADC) 342, a controller 370 and digital-to-analog converters (DAC) 330 and 335. ADC 342 is coupled to the output of photodetector 318 while DACs 330 and 335 are coupled to the phase shifters of stages 310 and 320, respectively. Controller 370 may be part of the same circuitry used to implement controller 120 of FIG. 1, although not all embodiments are limited in this respect. Controller 370 monitors the photocurrent generated by photodetector 318 and controls the phase shifters based on the photocurrent to minimize the amount of optical power coupled to monitoring waveguide 304. For example, it may ensure that the power coupled to monitoring waveguide 304 is less than 10% of the total power present in stage 320. Alternative implementations of the feedback loop are possible, so long as the phase shifts to be imparted to the phase shifters depend upon the photocurrent produced a monitoring photodetector. In one potential alternative configuration, a monitoring photodetector (not shown) may be coupled to output waveguide 302 to extract a fraction of the light propagating towards TX 104, and the feedback loop may be configured to maximize the photocurrent produced by that photocurrent. In another potential alternative configuration, a monitoring photodetector (not shown) may be coupled to I/O waveguide 303 to extract a fraction of the light propagating towards I/O port 112, and the feedback loop may be configured to maximize the photocurrent produced by that photocurrent.

In some embodiments, the arms of interleaver 300 may have portions made of materials having different thermo-optic coefficients. For example, certain portions may be made of silicon (having a higher thermo-optic coefficient) and other portions may be made of silicon nitride (having a lower thermo-optic coefficient). In one example, leveraging silicon's higher thermo-optic coefficient, the arm portions where the phase shifters 322 are defined are made of silicon, thus increasing the interleaver's ability to thermally control the phase shifters. By contrast, leveraging silicon nitride's lower thermo-optic coefficient, the arm portions where the phase shifters 322 are not defined may be made of silicon nitride, thus increasing the interleaver's immunity to thermal fluctuations.

IV. Interleavers Based on Alternating Wavelengths

Figure 4A:
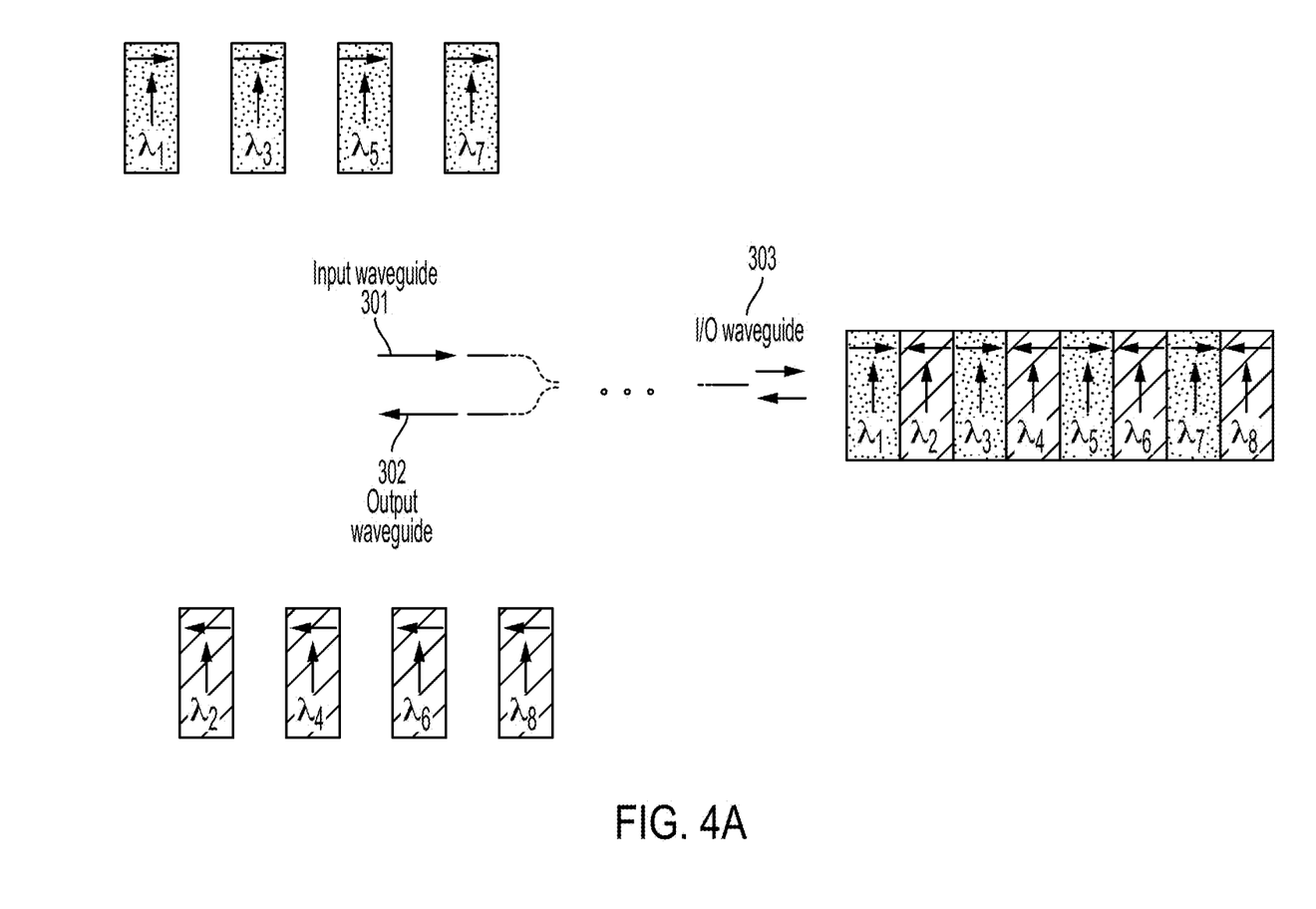
FIG. 4A schematically illustrates an example of an interleaving function performed by an optical interleaver, in accordance with some embodiments.
Figure 4B:
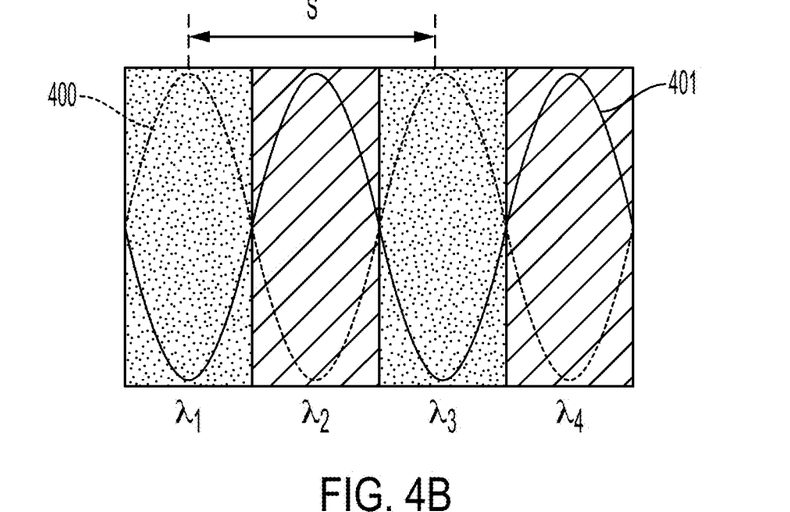
FIG. 4B schematically illustrates the shape of an interleaving function, in accordance with some embodiments.

Interleaver 110 may be configured to operate on the basis of alternating carrier wavelengths, contiguous carrier wavelengths, or in accordance with any other suitable scheme. This section describes interleavers operating on the basis of alternating wavelengths. FIG. 4A schematically illustrates an example of an interleaving function performed by an interleaver operating in this way. In the interest of clarity, only input waveguide 301, output waveguide 302 and I/O waveguide 303 are illustrated, while the other components of interleaver 300 are omitted. In this example, the carrier wavelengths of the TX wavelength set alternate with the carrier wavelengths of the RX wavelength set. It should be noted that the values of the carrier wavelengths are defined so that a carrier wavelength $\lambda_i$ is greater than a carrier wavelength $\lambda_{i-1}$ but is smaller than a carrier wavelength $\lambda_{i-1}$. In other words, the value of $\lambda_i$ increases as the index i increases. As shown in FIG. 4A, interleaver 300 allows selective coupling of light having carrier wavelengths with odd indices ($\lambda_1, \lambda_3, \lambda_5$, and $\lambda_7$). As such, carrier wavelengths with odd indices are allowed to propagate from input waveguide 301 to I/O waveguide 303 (due to constructive interference) but are prevented from coupling to output waveguide 302 (due to destructive interference). Similarly, interleaver 300 allows selective coupling of light having carrier wavelengths with even indices ($\lambda_2, \lambda_4, \lambda_6$, and $\lambda_8$). As such, carrier wavelengths with even indices are allowed to propagate from I/O waveguide 303 to output waveguide 302 (due to constructive interference) but are prevented from coupling to input waveguide 301 (due to destructive interference). This alternating spectral response can be accomplished by choosing the asymmetry of the interleaver so that the periodicity of the interleaver's responses matches the separation between the WDM channels. FIG. 4B is a plot illustrating the spectral response 400 of an interleaver at input waveguide 301 and the spectral response 401 at output waveguide 302. As shown, "S" indicates the spectral separation between adjacent channels that belong to the same wavelength set. In alternating schemes, the periodicity of the spectral responses 401 and 402 match the spectral separation between adjacent channels.

In some embodiments, the spectral separation between adjacent channels that belong to the same wavelength set is the range of 1.72 nm-2.86 nm. This wavelength separation corresponds to a frequency separation of about 300 GHz-500 GHz in the O-band. The spectral separation between adjacent channels that belong to different wavelength sets may be in the range of 1.14 nm-2.28 nm. This wavelength separation correspond to a frequency separation of about 100 GHz-300 GHz in the O-band.

Figure 4C:
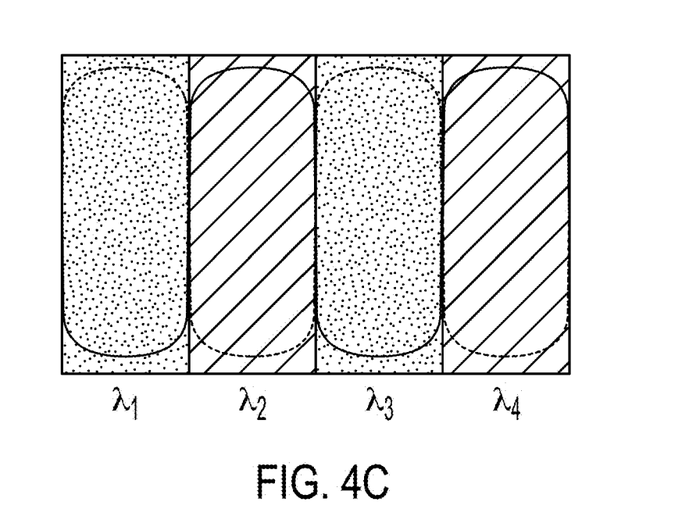
FIG. 4C schematically illustrates the shape of another interleaving function, in accordance with some embodiments.

It should be noted that the spectral responses depicted in FIG. 4B exhibit sinusoidal shapes, which is the case when an MZI is implemented as a single-stage MZI. However, as described above in connection with FIG. 3B, multi-stage MZIs may be used in some embodiments. Relative to single-stage MZIs, multi-stage MZIs produce a sharper spectral response, making the interleaver more robust against thermal fluctuations. FIG. 4C is a plot illustrating examples of spectral responses when the MZI has multiple stages. As shown, the top portions of the responses are flatter and the transitions are steeper than what is shown in FIG. 4B. In some embodiments, a two-stage MZI may produce a Chebyshev-type response or a Butterworth-type response, although other shapes are also possible. Because of the flatter top and the steeper transitions, multi-stage MZIs are more robust than single-stage MZIs against spectral drift due to thermal fluctuations.

V. Interleavers Based on Contiguous Wavelengths

Figure 5A:
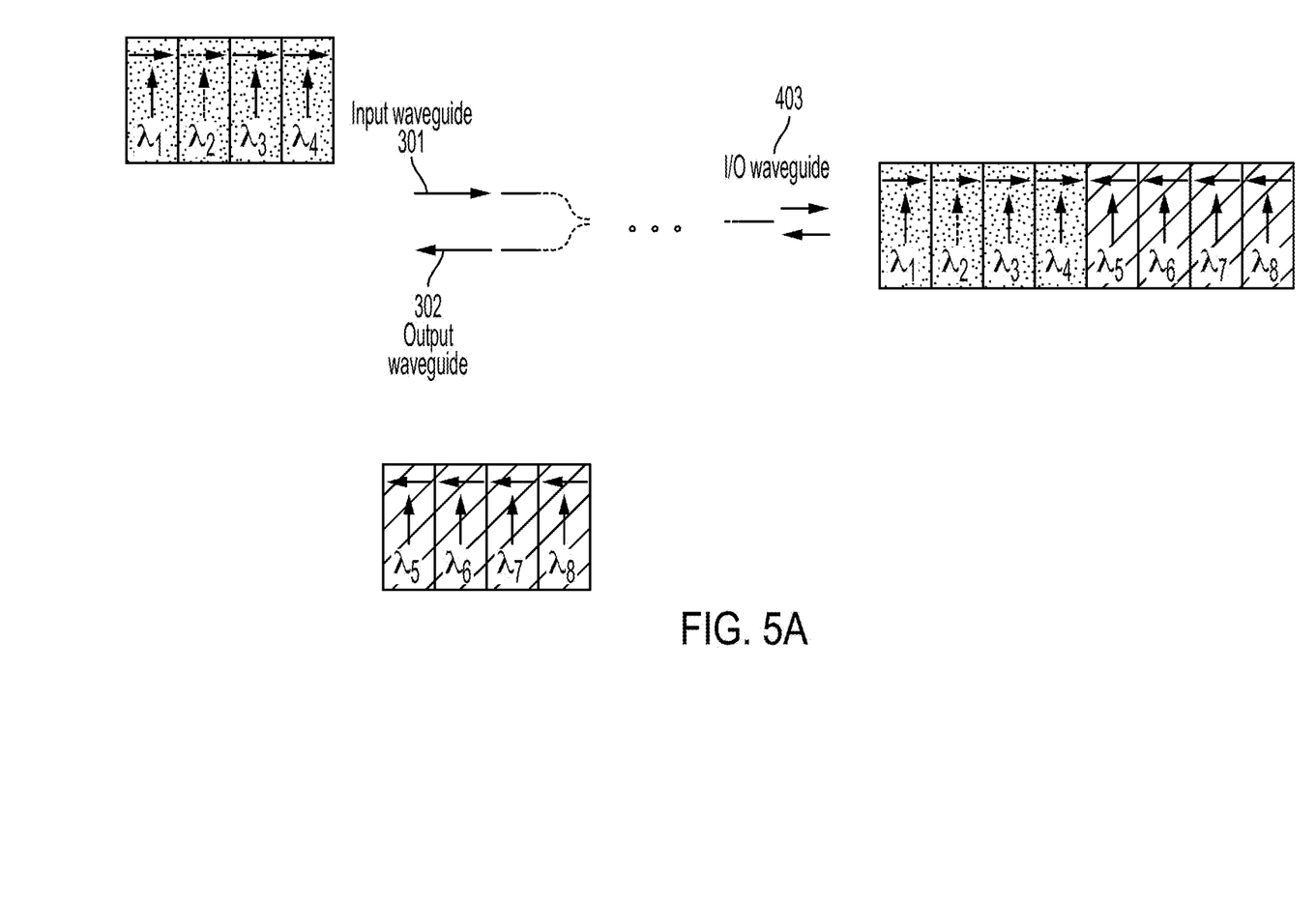
FIG. 5A schematically illustrates another example of an interleaving function performed by an optical interleaver, in accordance with some embodiments.

This section describes interleavers operating on the basis of contiguous carrier wavelengths. FIG. 5A schematically illustrates an example of an interleaving function performed by an interleaver operating in this way. In this case, instead of operating on the basis of alternating carrier wavelengths, the interleaver operates on the basis of alternating bands of contiguous carrier wavelengths.

As shown, interleaver 300 allows selective coupling of light having carrier wavelengths in a first band of contiguous carrier wavelengths ($\lambda_1, \lambda_2, \lambda_3$, and $\lambda_4$). As such, carrier wavelengths in the first band are allowed to propagate from input waveguide 301 to I/O waveguide 303 (due to constructive interference) but are prevented from coupling to output waveguide 302 (due to destructive interference). Similarly, interleaver 300 allows selective coupling of light having carrier wavelengths in a second band of contiguous carrier wavelengths ($\lambda_5, \lambda_6, \lambda_7$, and $\lambda_8$). As such, carrier wavelengths in the second band are allowed to propagate from I/O waveguide 303 to output waveguide 302 (due to constructive interference) but are prevented from coupling to input waveguide 301 (due to destructive interference). Providing a spectral response with alternating bands can be accomplished by choosing the asymmetry of the interleaver so that periodicity of the interleaver's responses is substantially greater than the separation between the WDM channels. For example, the spectral separation between adjacent channels that belong to the same wavelength set may be in the range of 1.72 nm-2.86 nm, while the periodicity of the interleaver's responses may be in the range of 10 nm-20 nm.

Figure 5B:
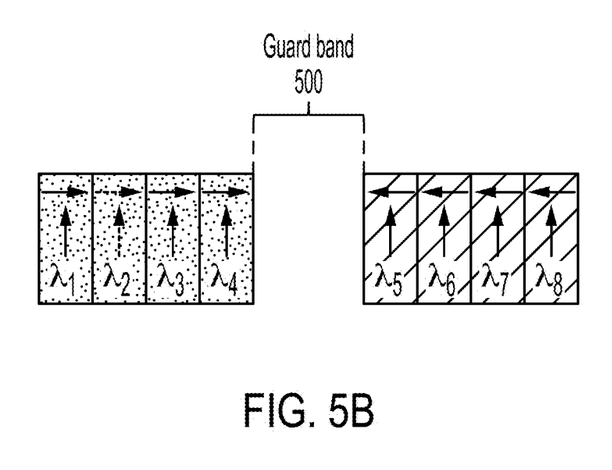
FIG. 5B schematically illustrates a guard band that separates the wavelengths of a transmit wavelength set from the wavelengths of a receiver wavelength set, in accordance with some embodiments.

As for interleavers operating on the basis of alternating carrier wavelengths, interleavers operating on the basis of contiguous carrier wavelengths may be implemented using multi-stage interferometers, thereby improving the interleaver's immunity to thermal fluctuations. Additionally or alternatively, a guard band may be introduced between the TX wavelength set and the RX wavelength set. The guard band may ensure accurate selection of WDM channels by the interleaver notwithstanding relatively slow (as opposed to steep) transitions in the spectral response of the interleaver. FIG. 5B illustrates a guard band 500 that separates the wavelengths of the TX wavelength set from the wavelengths of the RX wavelength set. The presence of a guard band allows the interleaver to be configured to exhibit transitions that are less steep, thus simplifying its design. In some embodiments, guard band 500 may be in the range of 4.3 nm-7 nm, corresponding to a frequency separation of about 750 GHz to 1225 GHz in the O-band. The amount of separation may be set by appropriately choosing the asymmetry of the interleaver.

VI. Polarization Controllers

Figure 6:
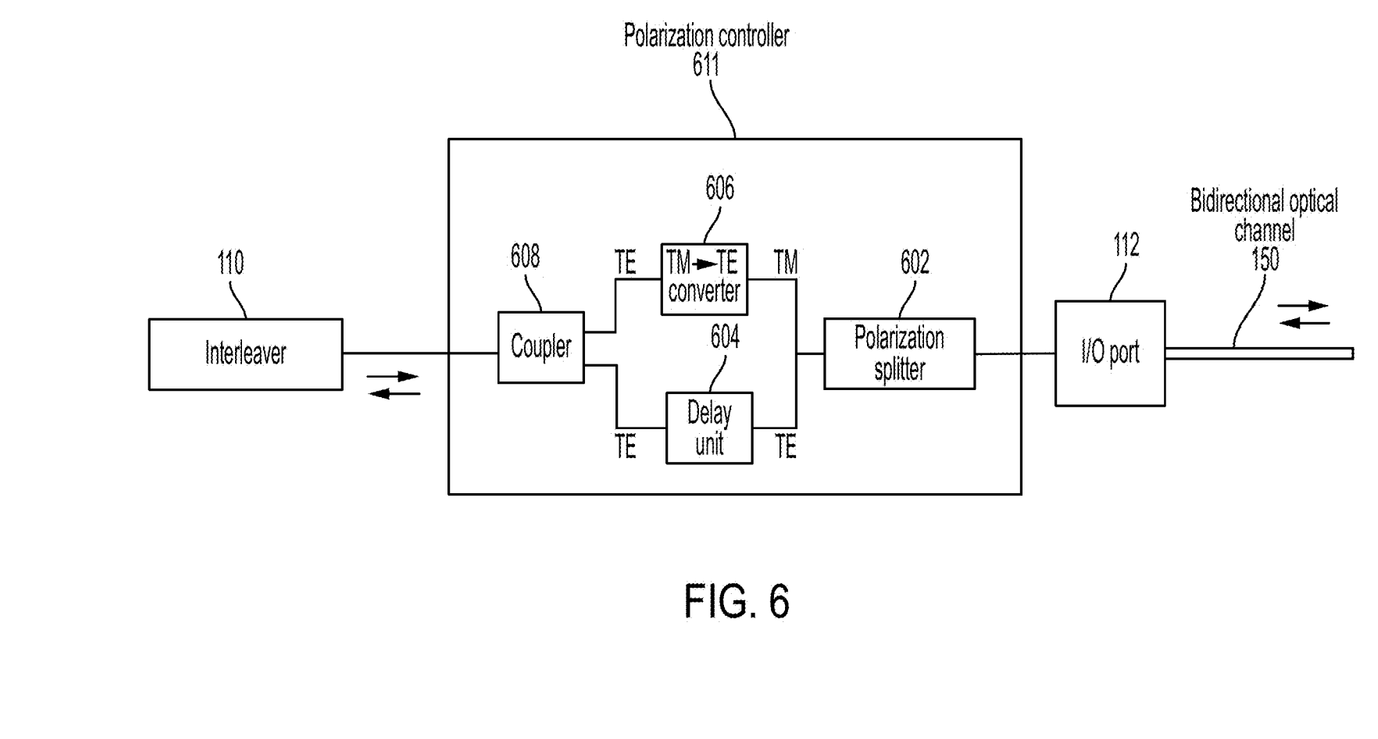
FIG. 6 is a schematic diagram illustrating an implementation of the polarization controller of the WDM transceiver of FIG. 1, in accordance with some embodiments.

Optionally, transceiver 100 may include a polarization controller. As shown in FIG. 1, a polarization controller 111 may be positioned along the optical path between interleaver 110 and I/O port 112. The inventors have recognized and appreciated that the ability of interleaver 110 to perform the functions described above may be polarization dependent. In some embodiments, interleaver 110 may be configured to operate using transverse electric (TE) modes. The presence of modes other than TE modes, such as transverse magnetic (TM), may negatively affect the performance of interleaver 110. Unfortunately, light received by I/O port 112 upon propagation along optical channel 150 may have arbitrary polarization. This is because certain optical channels, such as fibers, are not polarization-maintaining. The result is that, when coupled on the PIC, the incoming light may include both a TE component and a TM component Polarization controller 111 may be configured to rotate the polarization of the TM component so as to produce a pure TE mode. FIG. 6 is a block diagram illustrating an example of a polarization controller. Polarization controller 611 includes a polarization splitter 602, a delay unit 604, a TM-TE converter 606 and a coupler 608. Polarization splitter 602 separates light received by I/O port 112 upon propagation along optical channel 150 into a TE component and a TM component. The TE component is provided to delay unit 604 and the TM component is provided to TM-TE converter 606. Delay unit 604 delays the TE component as needed to ensure that the optical signals propagating in the two branches depicted in FIG. 6 have the same phase. TM-TE converter 606 rotates the polarization of the TM component by an amount so as to produce a TE component. The result is that the output of TM-TE converter 606 is also TE. The TE components exiting delay unit 604 and TM-TE converter 606 are combined using coupler 608, thereby providing a pure TE mode to interleaver 110.

VII. Definitions

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The definitions, as defined and used herein, should be understood to control over dictionary definitions, definitions in documents incorporated by reference and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some case and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately," "substantially," and "about" may be used to mean within ±20% of a target value in some embodiments. The terms "approximately," "substantially," and "about" may include the target value.

Use of ordinal terms such as "first," "second," "third," etc., in the claims to modify a claim element does not by itself connotate any priority, precedence, or order of one claim element over another or the temporal order in which acts of a method are performed, but are used merely as labels to distinguish one claim element having a certain name from another claim element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The terms "couple," "coupled," and "coupling," when used in connection with optical components, are to be interpreted broadly to include both direct and indirect coupling. Two optical components are considered directly coupled if there are no intervening components between them. In contrast, two optical components are considered indirectly coupled if there is at least one intervening component between them, provided that the intervening component does not alter the general nature of the interaction between the optical components.

What is claimed is:

1. An optical transceiver, comprising:
    a transmitter comprising a first bus waveguide and a plurality of optical modulators coupled to the first bus waveguide, each of the plurality of optical modulators being resonant at a respective wavelength in a first wavelength set;
    a receiver comprising a second bus waveguide and a plurality of optical filters coupled to the second bus waveguide, each of the plurality of optical filters being resonant at a respective wavelength in a second wavelength set;
    an input/output (I/O) port configured to be coupled to an optical channel, wherein the I/O port forms part of a transmit path coupling the transmitter to the optical channel when the optical channel is coupled to the I/O port and wherein the I/O port forms part of a receive path coupling the receiver to the optical channel when the optical channel is coupled to the I/O port; and
    an optical interleaver comprising a multi-stage Mach Zehnder interferometer (MZI) having a first coupler coupled to both the first and second bus waveguides, a second coupler coupled to the I/O port, and a third coupler coupled to both a first stage of the multi-stage MZI and a second stage of the multi-stage MZI, wherein the multi-stage MZI is configured to:
selectively couple light having carrier wavelengths in the first wavelength set from the first waveguide bus to the I/O port, and
selectively couple light having carrier wavelengths in the second wavelength set from the I/O port to the second bus waveguide.

2. The optical transceiver of claim 1, wherein the first stage of the multi-stage MZI defines a first optical path length difference and the second stage of the multi-stage MZI defines a second optical path length difference different from the first optical path length difference.

3. The optical transceiver of claim 2, wherein the first optical path length difference is about twice the second optical path length difference.

4. The optical transceiver of claim 1, wherein the carrier wavelengths of the first wavelength set are contiguous and the carrier wavelengths of the second wavelength set are contiguous.

5. The optical transceiver of claim 4, wherein the optical interleaver further comprises first and second optical arms, wherein an optical path length difference between the first and second optical arms is configured to cause the optical interleaver to:
selectively couple light having the contiguous carrier wavelengths in the first wavelength set from the first waveguide bus to the I/O port, and
selectively couple light having the contiguous carrier wavelengths in the second wavelength set from the I/O port to the second bus waveguide.

6. The optical transceiver of claim 1, wherein the carrier wavelengths of the first wavelength set alternate with the carrier wavelengths of the second wavelength set.

7. The optical transceiver of claim 6, wherein the optical interleaver further comprises first and second optical arms, wherein an optical path length difference between the first and second optical arms is configured to cause the optical interleaver to:
selectively couple light having the alternating carrier wavelengths in the first wavelength set from the first waveguide bus to the I/O port, and
selectively couple light having the alternating carrier wavelengths in the second wavelength set from the I/O port to the second bus waveguide.

8. The optical transceiver of claim 1, wherein the transmitter, the receiver, the I/O port and the optical interleaver are integrated on a common substrate, and wherein the I/O port comprises a grating coupler or an edge coupler.

9. An optical transceiver, comprising:
a transmitter comprising a first bus waveguide and a plurality of optical modulators coupled to the first bus waveguide, each of the plurality of optical modulators being resonant at a respective wavelength in a first wavelength set;
a receiver comprising a second bus waveguide and a plurality of optical filters coupled to the second bus waveguide, each of the plurality of optical filters being resonant at a respective wavelength in a second wavelength set;
an input/output (I/O) port configured to be coupled to an optical channel, wherein the I/O port forms part of a transmit path coupling the transmitter to the optical channel when the optical channel is coupled to the I/O port and wherein the I/O port forms part of a receive path coupling the receiver to the optical channel when the optical channel is coupled to the I/O port;
an optical interleaver configured to:
selectively couple light having carrier wavelengths in the first wavelength set from the first waveguide bus to the I/O port, and
selectively couple light having carrier wavelengths in the second wavelength set from the I/O port to the second bus waveguide; and
an optical polarization controller coupled between the I/O port and the optical interleaver, wherein the optical polarization controller is configured to provide a pair of output transverse electric (TE) modes to the optical interleaver upon receiving an input TE mode and an input transverse magnetic (TM) mode from the optical channel when the optical channel is coupled to the I/O port.

10. The optical transceiver of claim 9, wherein the optical interleaver comprises at least one interferometer selected from the group consisting of a multimode interferometer (MMI) device, an arrayed waveguide grating (AWG) and an asymmetric Mach Zehnder interferometer (MZI).

11. The optical transceiver of claim 9, wherein the carrier wavelengths of the first wavelength set are contiguous and the carrier wavelengths of the second wavelength set are contiguous.

12. The optical transceiver of claim 9, wherein the carrier wavelengths of the first wavelength set alternate with the carrier wavelengths of the second wavelength set.

13. The optical transceiver of claim 9, wherein the transmitter, the receiver, the I/O port and the optical interleaver are integrated on a common substrate, and wherein the I/O port comprises a grating coupler or an edge coupler.

14. An optical transceiver, comprising:
a transmitter comprising a first bus waveguide and a plurality of optical modulators coupled to the first bus waveguide, each of the plurality of optical modulators being resonant at a respective wavelength in a first wavelength set;
a receiver comprising a second bus waveguide and a plurality of optical filters coupled to the second bus waveguide, each of the plurality of optical filters being resonant at a respective wavelength in a second wavelength set;
an input/output (I/O) port configured to be coupled to an optical channel, wherein the I/O port forms part of a transmit path coupling the transmitter to the optical channel when the optical channel is coupled to the I/O port and wherein the I/O port forms part of a receive path coupling the receiver to the optical channel when the optical channel is coupled to the I/O port; and
an optical interleaver configured to:
selectively couple light having carrier wavelengths in the first wavelength set from the first waveguide bus to the I/O port, and
selectively couple light having carrier wavelengths in the second wavelength set from the I/O port to the second bus waveguide,
wherein the carrier wavelengths in the first wavelength set are spaced from one another by a spectral separation in a range of 1.72 nm-2.86 nm and the carrier wavelengths in the second wavelength set are spaced from one another by a spectral separation in a range of 1.72 nm-2.86 nm.

15. The optical transceiver of claim 14, wherein the plurality of optical modulators have free spectral ranges (FSR) that are less than 11.44 nm.

16. The optical transceiver of claim 14, wherein the optical interleaver comprises a Mach Zehnder interferometer (MZI) having a first coupler coupled to both the first and second bus waveguides and a second coupler coupled to the I/O port.

17. The optical transceiver of claim 16, wherein the MZI further comprises a third coupler coupled to both a first stage of the MZI and a second stage of the MZI.

18. The optical transceiver of claim 14, wherein the optical interleaver comprises at least one interferometer selected from the group consisting of a multimode interferometer (MMI) device, an arrayed waveguide grating (AWG) and an asymmetric Mach Zehnder interferometer (MZI).

19. An optical transceiver, comprising:
   a transmit bus waveguide and a plurality of optical resonant modulators coupled to the transmit bus waveguide;
   a receive bus waveguide and a plurality of optical resonant filters coupled to the receive bus waveguide; and
   an asymmetric Mach Zehnder interferometer (MZI) having a first end and a second end opposite the first end, wherein the first end comprises a first waveguide coupled to the transmit bus waveguide and a second waveguide coupled to the receive bus waveguide, and wherein the second end comprises a third waveguide, wherein the asymmetric MZI comprises a plurality of stages defining a plurality of optical path length differences,
   wherein the optical path length differences are configured to cause the asymmetric MZI to:
      selectively couple light having carrier wavelengths in a first wavelength set from the first waveguide to the third waveguide, and
      selectively couple light having carrier wavelengths in a second wavelength set from the third waveguide to the second waveguide,
   wherein the carrier wavelengths of the first wavelength set alternate with the carrier wavelengths of the second wavelength set.

20. The optical transceiver of claim 19, wherein a first carrier wavelength of the first wavelength set and a second carrier wavelength of the second wavelength set that are adjacent to one another are spaced from one another by a spectral separation in a range of 1.14 nm-2.28 nm.

21. The optical transceiver of claim 19, further comprising an optical polarization controller coupled to the third waveguide of the asymmetric MZI, wherein the optical polarization controller is configured to provide a pair of output transverse electric (TE) modes to the asymmetric MZI upon receiving an input TE mode and an input transverse magnetic (TM) mode.

22. The optical transceiver of claim 19, wherein the asymmetric MZI further comprises:
   a phase shifter positioned between the first end and the second end, wherein the second end of the asymmetric MZI further comprises a fourth waveguide;
   a photodetector coupled to the fourth waveguide; and
   a controller configured to receive photocurrent produced by the photodetector and to control the phase shifter, based on the photocurrent, so as to minimize an amount of optical power coupled to the fourth waveguide.

* * * * *